INVENTORS.
MATTHEW G. RYAN.
RONALD E. STURM.
JAMES E. LINDSAY, JR.
RICHARD C. WEBB.
BY Herman Seid
ATTORNEY.

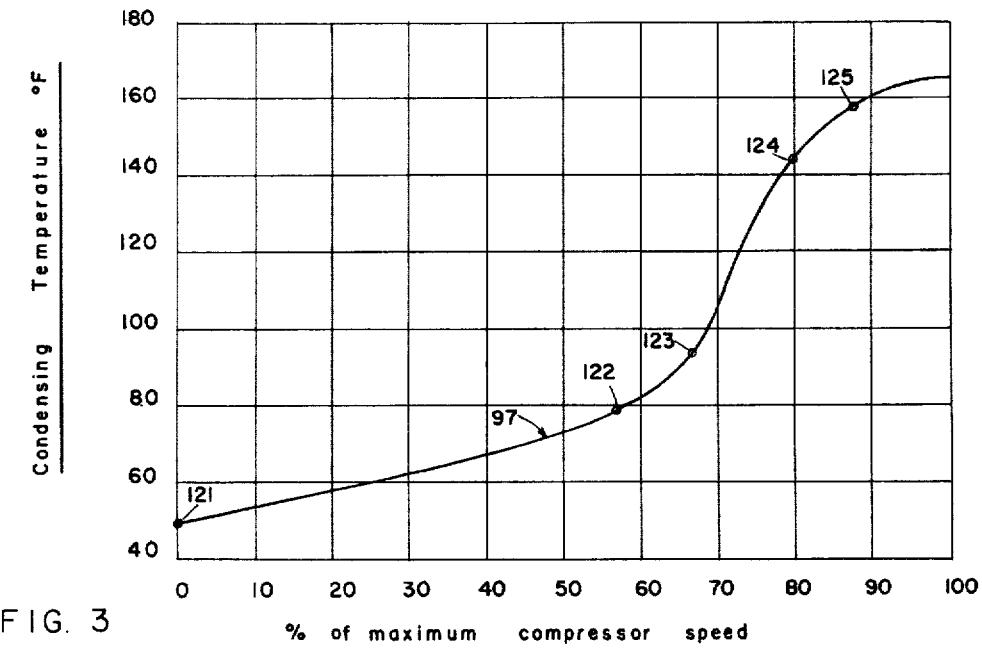
FIG. 3
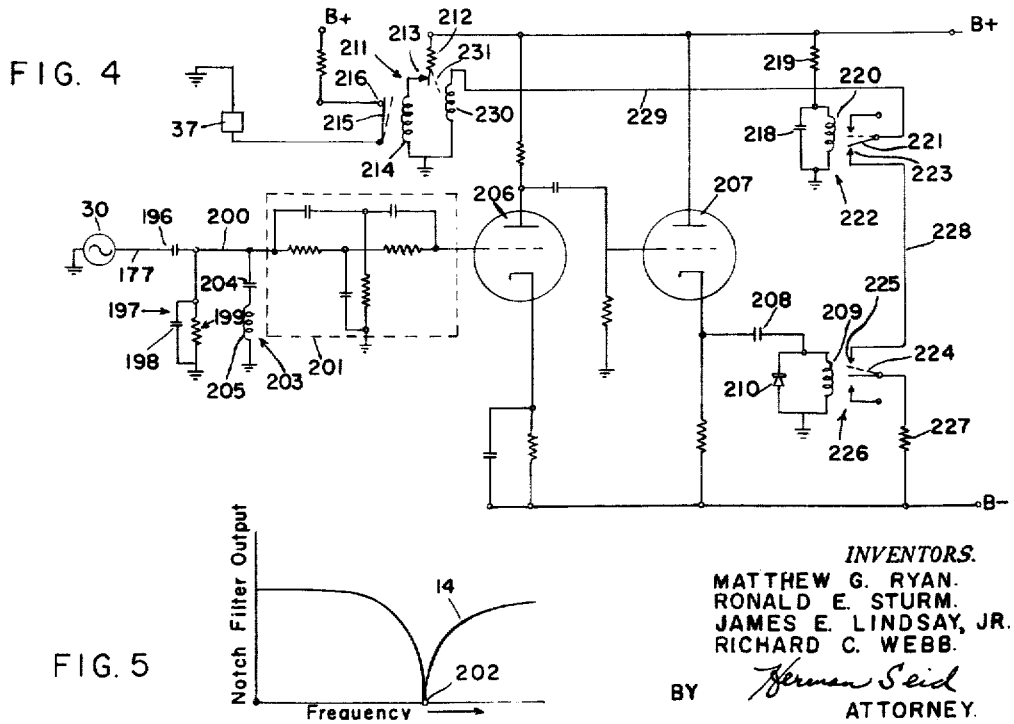
FIG. 4
FIG. 5
INVENTORS.
MATTHEW G. RYAN.
RONALD E. STURM.
JAMES E. LINDSAY, JR.
RICHARD C. WEBB.
BY Herman Seid
ATTORNEY.

United States Patent Office 3,082,609
Patented Mar. 26, 1963

3,082,609
AIR CONDITIONING SYSTEM FOR AIRCRAFT
Matthew G. Ryan, De Witt, N.Y., and Richard C. Webb, Ronald E. Sturm, and James E. Lindsay, Jr., Denver, Colo., assignors, by direct and mesne assignments, to Carrier Corporation, Syracuse, N.Y., a corporation of Delaware
Filed Feb. 12, 1957, Ser. No. 639,809
21 Claims. (Cl. 62—89)

This invention relates to an air conditioning system for an aircraft and more particularly to a vapor cycle air conditioning system employing a controlled variable speed centrifugal compressor.

It is one of the main objects of this invention to provide a vapor cycle aircraft air conditioning system employing a controlled centrifugal compressor which can be safely operated on an aircraft, the control assuring reliable functioning of the air conditioning system to provide satisfactory temperature regulation while the aircraft is in flight and insuring complete safety by preventing the air conditioning system from breaking down and possibly interfering with proper operation of the aircraft.

It is another important object of this invention to provide a vapor cycle air conditioning system for an aircraft which utilizes a centrifugal compressor and thus is of minimum weight.

Another object of this invention is to provide an aircraft air conditioning system which will automatically maintain a constant temperature of cooled air leaving the evaporator by varying the compressor speed, as required.

A further object of this invention is to provide a vapor cycle air conditioning system for an aircraft which will operate substantially continuously in that the compressor speed is varied to provide a flow of constant temperature cooled air, thus obviating the necessity of starting and stopping the system frequently.

It is another object of this invention to provide a vapor cycle aircraft air conditioning system in which a centrifugal compressor of a vapor cycle refrigeration system is driven by an air turbine which is in turn driven by bleed air obtained from a turbo-jet engine, thus permitting the air conditioning system to be motivated by an element which is an integral part of the aircraft, namely, the turbo-jet engine, without requiring the use of other elements, such as motors, which would unnecessarily add weight to the aircraft.

A still further object of this invention is to provide a control circuit for a vapor cycle refrigerating system which varies the condensing temperature of the system in accordance with the compressor speed in order to maintain the optimum condensing temperature at any given compressor speed, thus insuring highest possible efficiency of the air conditioning system under all conditions of operation.

Another object of this invention is to provide a control circuit for a vapor cycle aircraft air conditioning system utilizing a variable speed centrifugal compressor wherein the condenser is cooled by air scooped from outside of the aircraft and the quantity of this scooped air is adjusted to an optimum amount which will cause a minimum of drag on the aircraft while in flight but will maintain the temperature of the condenser sufficiently low to minimize undersirable "surge" (as defined hereafter) on the compressor.

Another object of this invention is to provide a control circuit for the centrifugal compressor of an aircraft vapor cycle air conditioning system which will discontinue operation of the compressor if it exceeds the maximum permissible safe speed at which it can operate.

It is another object of this invention to provide a control circuit for a vapor cycle air conditioning system which will tend to minimize "hunting" of a variable speed compressor as it changes speeds in response to changes in demand for cooling thus obviating unnecessary strain on the components of the refrigerating and control circuits.

A still further object of this invention is to provide circuitry which will shut off the air conditioning system in the event that portions of the compressor speed control circuit are rendered inoperative, thus insuring safe operation of the system. Other objects of the present invention will become readily apparent hereafter.

The present invention relates to an aircraft vapor cycle air conditioning system employing a centrifugal compressor which has its speed controlled. In the operation of the system either ram air which is scooped from outside of the aircraft (and may be compressed for cabin pressurization) or cabin air or a combination of both is cooled by passing it over the evaporator of the air conditioning system. This cooled air is then passed through suitable ducts to the cabin of the aircraft. It is desirable to maintain this cooled air at a constant temperature. For this purpose, a temperature sensing device, which forms a part of the control circuit, is placed in the cooled airstream to measure its temperature. When the air temperature varies from that which is desired, the device senses the variation and activates the control circuit to ultimately actuate a valve which controls the amount of air which flows from the aircraft jet engine to a turbine which drives the compressor of the refrigerating system. In this manner the compressor has its speed changed so that more or less heat is absorbed from the air passing through the evaporator, as required. As the temperature of the air leaving the evaporator changes because of changes in the ambient air temperature, for example, the compressor speed is again changed in the foregoing manner to maintain the desired temperature of the air leaving the evaporator.

The refrigerant in the system is cooled by passing ram air, which is scooped from outside the aircraft, over the condenser. For the most efficient operation of the air conditioning system it is desirable to cool the condenser to as low a temperature as possible. This requires a relatively large amount of air to be scooped into a duct in which the condenser is located. However, only a certain maximum amount of air can be scooped into cooling relationship with the condenser. If this amount is exceeded, undesirable aerodynamic drag will be placed on the aircraft. On the other hand, if not enough air is scooped over the condenser, the condensing temperature will be too high and a condition known as "surge" will develop in the compressor. This "surge" is characterized by excessive vibration of the compressor which in turn may result in its breakdown. Consequently, for any given compressor speed the condenser cannot be cooled below a certain temperature or else undesirable aerodynamic drag on the aircraft will occur, but it must be cooled sufficiently to prevent "surge." Therefore, depending on the speed of the compressor, an element of the control circuit controls a damper in the condenser duct to vary the amount of ram air which is fed over the condenser and thus, for any compressor speed, controls the condensing temperature to minimize "surge" while preventing undesirable aerodynamic drag.

Certain safety features are incorporated into the control circuit. A speed sensing element measures the compressor speed at all times. If the compressor tends to exceed its safe operating speed, the control circuit will automatically slow down or shut down the refrigerating system. Another safety feature is the checking circuit which determines whether the compressor speed sensing element is operating correctly. If it is not, the refrigerating system will be automatically shut down by stopping the air flow to the turbine which drives the compressor. The present invention will be more fully understood when it is considered in connection with the accompanying drawings wherein:

FIGURE 3 is a graph which depicts the proper condensing temperature of the air conditioning system depending on the compressor speed;

FIGURE 4 is the portion of the circuit which is used for overspeed control and for checking whether the device which measures the compressor speed is operating properly; and FIGURE 5 is a diagram which depicts the mode of operation of a portion of the circuit of FIGURE 4.

Figure 1:
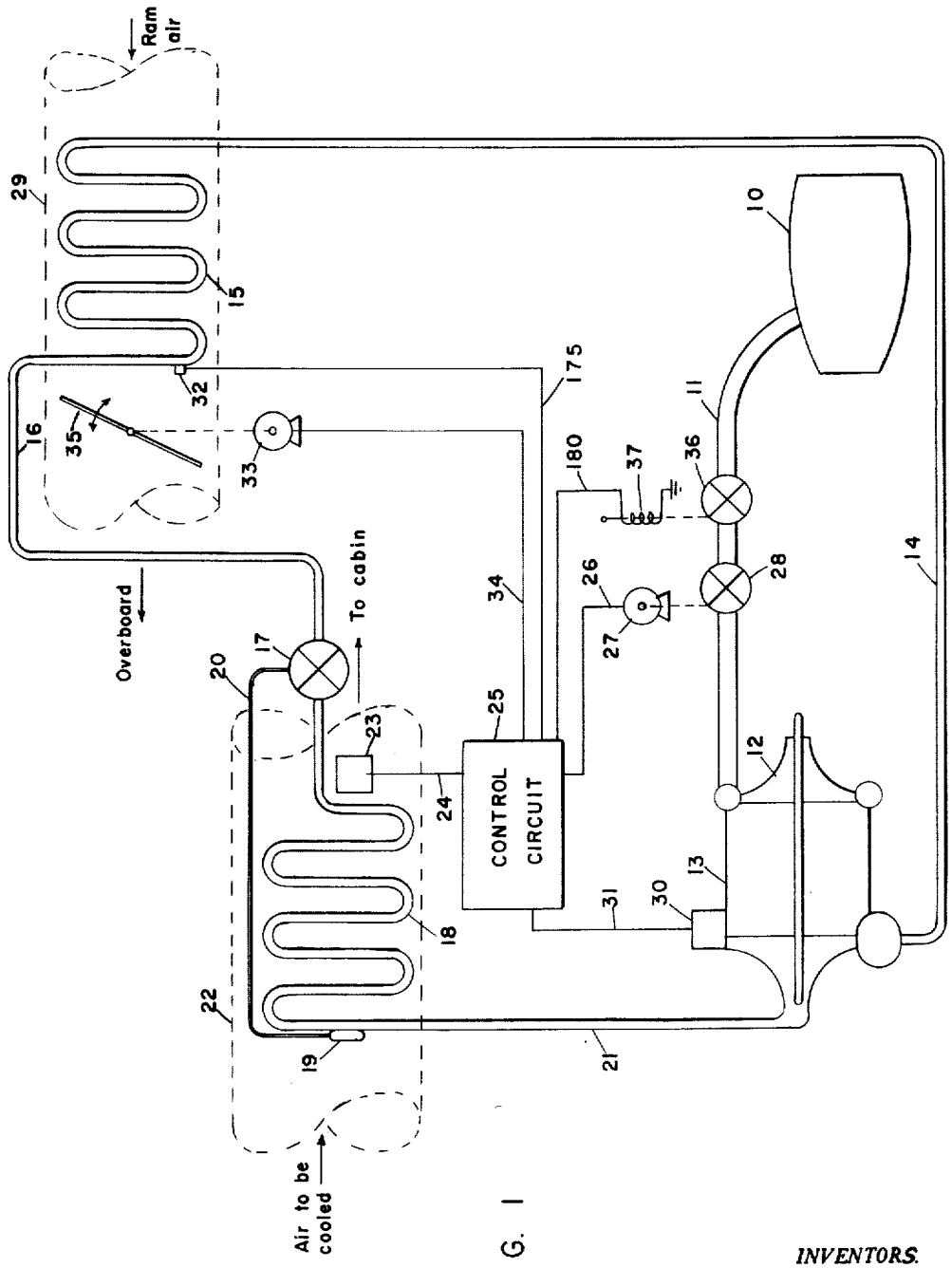
FIGURE 1 is a simplified schematic diagram showing the air conditioning system which is used on the aircraft and the relationship of the control to it.

In FIGURE 1 a turbo-jet engine 10 is shown which supplies compressed air via line 11 to drive turbine 12 which in turn drives variable speed centrifugal compressor 13. Compressor 13 supplies compressed refrigerant via line 14 to condenser 15. The refrigerant is then passed through line 16 and expansion valve 17 to evaporator 18 where the desired cooling is obtained in the usual manner. Thermal expansion valve 17 is controlled by bulb 19, which senses the refrigerant temperature, and is connected to valve 17 by line 20. The refrigerant is caused to pass by suction via line 21 leading from the evaporator 18 to the inlet of the compressor 13. The foregoing cycle is then repeated.

In the operation of the foregoing refrigeration circuit it is desirable to maintain at a constant temperature the ram air (or pressurized air) or cabin air or combination of these which passes to the aircraft cabin through duct 22 surrounding evaporator 18. Thus it can be seen that the temperature of the evaporator must be varied with changes of temperature of the air passing through duct 22 since it is desired that air leaving duct 22 have a substantially constant temperature. In order to vary the temperature of the evaporator 18 to maintain the temperature of the air passing to the cabin substantially constant, a temperature sensing device 23 is placed in duct 22 for sensing the temperature of the air after it passes over evaporator 18. If the temperature of this air varies from the temperature which is desired, a signal is transmitted through electrical lead 24 to control circuit 25 (to be described in detail hereafter). In response to this signal, the control circuit, which is electrically connected by lead 26 to electric motor 27, will cause the latter to modulate valve 28, which is located in line 11, to vary the amount of air passing from engine 10 to turbine 12 and thus vary the speed of compressor 13 which is driven by turbine 12. In this manner the amount of cooling produced by evaporator 18 will be varied to maintain the temperature of the air passing through duct 22 at the desired value. Once a state of equilibrium has been reached, the compressor 13 will operate at its new speed until temperature sensing device 23 again indicates that the temperature of evaporator 18 should again be changed whereupon the foregoing cycle is repeated.

As noted above, after the refrigerant has been compressed it is passed to condenser 15 where it is cooled. This cooling is effected by positioning condenser 15 in duct 29 into which ram air is scooped, passed in heat exchange relationship with refrigerant in the condenser, and then discharged overboard. As noted above, the more air which is scooped through duct 29, the lower will be the condensing temperature and the higher the efficiency of the cooling system. However, the amount of air which can be scooped through duct 29 is limited because the scooping of too much air will create an undesirable aerodynamic drag on the aircraft. On the other hand, if the temperature of the condenser is maintained at too high a value by not passing enough ram air over it, "surge" will occur in the compressor. It has been found that there is an optimum condenser temperature for each compressor speed at which undesirable aerodynamic drag is obviated and at which the possibility of "surge" is minimized. This relationship is generally depicted by the graph shown in FIGURE 3.

The control circuit of the present invention maintains the desired condenser temperature in the following general manner, attention being directed to FIGURE 1. A speed sensing device 30 is coupled to the compressor and produces a signal which is representative of the compressor speed. This signal is coupled via lead 31 to control circuit 25. It is to be noted at this point that there is a direct relationship between the compressor speed and the desired temperature at the condenser which will obviate drag and minimize "surge," this relationship being depicted by the graph of FIGURE 3. Thus for any given compressor speed (the compressor speed being determined by the temperature desired at the evaporator, as noted above), there is an optimum condenser temperature. The speed signal which is obtained from speed sensing device 30 is coupled to control circuit 25 via lead 31. A "condenser temperature-compressor speed" translator circuit (described in detail hereafter) converts the speed signal so that for any given speed an electrical output is obtained from the translator which is proportional to the desired condenser temperature. The actual condenser temperature is measured by temperature sensing element 32 which is mounted proximate to condenser 15 and the electrical output therefrom is fed to control circuit 25 via lead 175. The control circuit compares these two temperature signals. If they differ from each other a motor 33 which is coupled to control circuit 25 by lead 34 is energized. Motor 33 is mechanically connected to damper 35 which regulates the amount of air flowing through duct 29. The position of damper 35 is adjusted until the actual condensing temperature is equivalent to the optimum condensing temperature at the speed at which the compressor is operating to satisfy the requirements of the curve of FIGURE 3. In this manner, undesirable aerodynamic drag on the aircraft is prevented and the possible occurrence of "surge" is minimized.

It is also to be noted from FIGURE 1 that the speed sensing device 30, which is coupled via lead 31 to the control circuit 25 selectively causes the latter to energize solenoid 37 via lead 180. Solenoid 37 in turn actuates valve 36 which is mounted in the air turbine supply line. If for any reason the speed of the compressor should exceed a predetermined maximum, the solenoid 37, which normally maintains valve 36 in an open position will be de-energized and a member such as a spring (not shown) will cause valve 36 to close and thus shut off the air supply to turbine 12. The purpose of this structure is to prevent damage to the compressor from excessive speed.

The specific circuitry which is capable of controlling the air conditioning system will now be described, attention being directed to FIGURE 2. The aircraft power supply is depicted by A.C. generator 38. This generator is coupled through leads 39 and 40 to rectifier and voltage stabilizer 41 which supplies a suitable source of direct current for operation of the control circuit. It is to be noted that the rectifier 41 is energized by master switch 42 in lead 40.

As noted above, a temperature sensing portion of the circuit 23 is positioned in the airstream which is is cooled by the evaporator 18 (FIGURE 1). The temperature sensitive element includes a thermistor 23' coupled in series with voltage divider resistor 43 across the B+ and B− terminals of the rectifier 41. As the temperature at the thermistor 23' rises, the voltage at terminal 44, which is between the thermistor 23' and resistor 43, will fall and vice versa. The voltage at terminal 44 is transferred via lead 45 and resistor 46 to the control grid of pentode 47. The cathode of pentode 47 is coupled to ground through cathode resistor 48. As can be seen from the diagram, the screen grid of pentode 47 is coupled to B+; the suppressor grid is coupled to the cathode; and the plate is coupled via plate resistor 49 to B+. Pentode 47 and triode 50 form an operational summing amplifier, as described more fully hereafter. A change of voltage on the control grid of pentode 47 will cause a change of voltage at its plate, i.e. as the former rises due to a lower temperature at thermistor 23', the voltage at the pentode plate will fall. The plate of pentode 47 is coupled via load resistor 51 to the grid of triode 50 which is also coupled to B— via resistor 52. The plate of triode 50 is coupled to B+ and the cathode is coupled via resistor 253 to B—. It can readily be seen that as the voltage on the plate of pentode 47 falls, the voltage on the grid of triode 50 also falls, thus decreasing the voltage at the cathode of triode 50.

Coupled to the cathode of triode 50 at terminal 53 in cathode follower relationship is magnetic amplifier 54, the function of which is to produce an alternating voltage related to the voltage at terminal 53 which drives motor 27 which in turn modulates valve 28 (FIGURE 1). The primary winding 55 of magnetic amplifier 54 is coupled across the aircraft's alternating voltage source 38 as is the winding 56 of motor 27. The control winding 57 of the magnetic amplifier 54 is coupled to terminal 53 of the cathode of triode 50 via lead 58. As the voltage at terminal 53 goes negative, it passes through diode 59 and winding 60 to ground; and as it goes positive it passes through diode 61 and winding 62 to ground. Capacitor 63, which is coupled across windings 60 and 62, is an A.C. bypass. The output winding 64 of magnetic amplifier 54 is coupled to one of the windings 65 of motor 27. Depending on the magnitude and polarity of the input to control winding 57, the motor 27 will have a corresponding speed and direction of rotation.

Depending on the variance of the actual temperature of thermistor 23' from its desired temperature, a signal is transmitted to the motor 27 which adjusts the opening of valve 28 (FIGURE 1) to which it is coupled. By varying the opening of valve 28, the amount of air which is fed to the turbine 12 is changed to vary the speed of the turbine and correspondingly to vary the speed of compressor 13. Thus the amount of cooling provided by the evaporator 18 (FIGURE 1) is varied to meet changing conditions and thus maintain the air going to the aircraft cabin at a substantially constant temperature.

It is necessary to measure the compressor speed for a plurality of purposes, as explained in detail hereafter. To measure the speed of compressor 13, a compressor speed sensing device 30 (FIGURE 1), which consists of a tone generator 30 (FIGURE 2), is mechanically connected to the shaft of the compressor 13 and generates an alternating voltage having a frequency which is proportional to the speed of the compressor 13. However, before the speed signal can be employed for its various purposes, the frequency signal is converted in the following manner to a D.C. signal which is proportional to, and therefore a measure of, the compressor speed: the alternating output of tone generator 30 is passed through capacitor 66 which blocks the D.C. component, and is then passed via resistor 67 to a clipper circuit 68 which cuts off the peaks of the sine wave which is generated by tone generator 30 to give a wave form 69. The purpose of clipping the sine wave is to prevent amplitude changes from the tone generator from affecting following portions of the circuit. Since clipper circuit 68 operates in the conventional manner, it is deemed unnecessary to give a detailed description of its mode of operation. The output of clipper circuit 68 is transmitted via lead 70 to a differentiator circuit consisting of condensor 71 and resistor 72, this circuit transforming wave form 69 to a wave form, such as depicted by numeral 73, having positive and negative spikes. The output from the differentiator circuit is taken at terminal 74, and passed through a polarity clipper consisting of diode 75; and in this portion of the circuit, the negative spikes are rejected to give wave form 76. The output from diode 75 is impressed on the grid of amplifying triode 77 which is placed in the circuit in a conventional manner, as shown. The output from amplifier triode 77 is taken from its plate (at which point the waveform assumes the shape depicted by numeral 78, that is, it is an inverted and amplified characterization of waveform 76), and it is coupled via condenser 79 to a conventional "one-shot" or monostable multivibrator 80. Every time multivibrator 80 is triggered by a pulse from waveform 78 it produces a square pulse 81 having a constant amplitude and a constant width. The number of square pulses 81 produced by multivibrator 80 per unit of time is dependent on the number of input pulses which is in turn dependent on the frequency of the waveform produced by the tone generator 30. The output from the multivibrator 80 is coupled via lead 82 to a D.C. setting or clamping circuit consisting of capacitor 83, diode 84, and resistor 85, as shown on the circuit diagram. The function of the clamping circuit is to give the output pulses from the multivibrator 80 a ground reference level. The clamp pulses are then taken from terminal 86 and fed to an integrator circuit consisting of resistor 87 and capacitor 88. The integrator averages the pulses obtained from the preceding circuit to give a D.C. output which is proportional in magnitude to the number of pulses per unit of time which are produced by multivibrator 80 which is in turn proportional to the frequency of the tone generator 30 which in turn is a measure of the speed of the compressor 13. Thus at terminal 89 at D.C. potential is obtained which is a direct measure of the speed of compressor 13.

One of the reasons for measuring the speed of the compressor 13 is to prevent "hunting" of the system. A speed rate circuit is used for this purpose and consists of a differentiator consisting of capacitor 90 and resistor 91. The input to this differentiator is taken from terminal 89, and is the output from the integrator which produces the direct voltage which is a measure of the compressor speed. The output from the differentiator is taken at terminal 92, and is supplied via lead 93 to the grid of above described pentode 47 which forms a part of the operational summing amplifier which receives a signal from thermistor 23'. It can readily be seen that when the cooled air leaving evaporator 18 is at the required temperature, no abnormal signal will be transmitted via lead 45 to the grid of pentode 47. Furthermore, when this condition exists, the compressor 13 will be operating at a constant speed, and this will result in a constant D.C. potential output at terminal 89 from the integrator which precedes this terminal. When the voltage at terminal 89 is constant there can be no output from the differentiator 90—91 at terminal 92 because the diferentiator can only produce a signal when the input thereto is changing.

When the thermistor 23' senses a departure from the required temperature, it produces a signal which ultimately energizes motor 27 to modulate valve 28 to vary the amount of air supplied to turbine 12 and thus change the speed of compressor 13, as described in detail above. However, the compressor 13 has a short time constant with respect to the evaporator time constant. In other words, the compressor can adjust its speed to deliver an increase or decrease in the amount of heat absorption in a fraction of the time required for this amount of absorption to be realized from the evaporator. Thus in response to the signal from thermistor 23', the compressor 13 will change its speed relatively instantaneously and continue to change its speed as long as there is a signal being produced by thermistor 23'. However, the signal from the thermistor 23' will continue until the required temperature is reached. If this type of operation were allowed, the compressor 13 will have speeded up too much, that is it will have overcorrected and caused an opposite signal to be produced by thermistor 23' with the result that the foregoing cycle will be repeated in a reverse direction. Therefore, this type of operation will produce a "hunting" effect wherein the compressor 13 tends to overcorrect in both directions, and unnecessary vacillations in compressor speed will result which produces undesirable and excessive operation of both the refrigerating and electronic circuits.

The above described speed rate circuit miminizes the occurrence of undesirable "hunting" of the compressor 13 in the following manner: As compressor 13 changes speed in response to a signal from thermistor 23', this change in rate of speed is reflected as a varying direct voltage at terminal 89, the output from integrator 87—88. Since this voltage is varying, it is differentiated by differentiator 90—91, and a voltage is obtained at terminal 92, the output of the differentiator, which has a sign opposite to the voltage which is produced by thermistor 23'. Thus, these two voltages will subtract and cause a lower net voltage to be applied to the control grid of pentode 47. The voltage and therefore the amount of correction which is supplied to motor 27, is much less than is indicated by thermistor 23'. Therefore compressor 13 will not overshoot but will tend to reach the speed required of it in a gradual manner. In short, the differentiating circuit 90—91 tends to oppose a change in compressor speed most when the tendency for it to change speed is greatest. On the other hand, when there is very little change of compressor speed required, there will be less opposition to this change supplied by the differentiator circuit. In the foregoing manner, the inequality of the compressor and evaporator time constants is compensated for and hunting of the system is minimized.

It is also to be noted at this point that a maximum speed control is incorporated into the circuit which prevents the compressor 13 from overspeeding. This control consists of diode 94 which is coupled to the output of integrator circuit 87—88 at terminal 89. Diode 94 is coupled through normally closed switch 95 and resistor 96 to the control grid of pentode 47, which forms a part of the operational summing amplifier. Diode 94 is normally non-conducting. However, once the voltage output at terminal 89 (the output from integrator 87—88) reaches a predetermined maximum value which indicates that the maximum compressor speed has been reached, diode 94 will conduct, and impress a positive voltage on the control grid of pentode 47. This positive voltage will in turn be ultimately used, as described in detail above, to actuate motor 27 to decrease the opening of valve 28, which action will slow down the compressor 13.

As explained above relative to FIGURE 1, the refrigerant, after leaving the compressor 13, is passed to condenser 15 in air duct 29 where it is condensed. The condensing temperature of refrigerant in condenser 15 is controlled by the position of damper 35 which meters the ram air which is scooped from outside the aircraft through duct 29. As noted above, the temperature of the condenser must be controlled within certain very narrow limits. More specifically, if an attempt is made to operate the condenser at too low a temperature, too much air will be scooped through duct 29 and thus cause undesirable aerodynamic drag on the aircraft. On the other hand, if the condenser is not operated at a sufficiently low temperature, "surge" (as defined above) will occur with possible detrimental results to the compressor. Consequently, it has been determined that for any given compressor speed there is an optimum condensing temperature at which undesirable aerodynamic drag on the aircraft is avoided by not scooping too much air through duct 29, and the possibility of "surge" is minimized by maintaining the condensing temperature at a sufficiently low value. This optimum relationship is shown in FIGURE 3 by curve 97 which depicts the condensing temperature which is desired at any given compressor speed.

Since the desired condensing temperature which will achieve the foregoing results for any given compressor speed is dependent on the speed of the compressor itself, a measure of the compressor speed can be used to control the condensing temperature. In this respect, the voltage output at terminal 89, which is proportional to the speed of compressor 13, is transferred via lead 98 to a "condensing temperature-compressor speed" translator circuit 99. The function of "condensing temperature-compressor speed" translator circuit 99 is to convert the terminal 89 voltage, which is an indication of the actual compressor speed, to a value which is proportional to the desired condensing temperature at that particular compressor speed. Circuit 99 performs this function by producing an output throughout its range of operation which simulates curve 97 of FIGURE 3.

In operation, circuit 99 is essentially a voltage divider network wherein the input voltage from terminal 89 is divided by passage through different paths dependent on its magnitude. The output from circuit 99 is taken at terminal 100. The voltage division in circuit 99 is between resistor 101 and resistor 102, the latter being selectively employed in parallel arrangement in combination with the following paths through the voltage divider: leg 103 consisting of resistor 104 and diode 105, and leg 106 consisting of resistor 107 and diode 108; leg 106 taken by itself; leg 109 consisting of resistor 110 and diode 111; or leg 112 consisting of diode 113 and resistor 114 and 109 consisting of resistor 110 and diode 111. Coupled between ground and B+ is lead 115 which contains resistors 116, 117, 118, 119 and 120. It is to be noted that all of the legs have a common terminal 100, the output terminal of circuit 99. Each of the other ends of legs 103, 106, 109 and 112, is connected between resistors 116 and 117, resistors 117 and 118, resistors 118 and 119, and resistors 119 and 120, respectively. Resistor 116 biases diode 105 at a certain value above ground; resistors 116 and 117 bias diode 108 at a certain value above ground; resistors 116, 117, and 118 bias diode 111 at a certain value above ground; and resistors 116, 117, 118 and 119 bias diode 113 at a certain value above ground.

The selective use of the various combinations of legs 103, 106, 109 and 112 in combination with resistor 102, as noted above, depends on the magnitude of the input voltage from terminal 89, certain outputs being obtained from terminal 100 according to the following mode of operation in order to obtain a varying voltage which resembles curve 97 of FIGURE 3: when the voltage input to circuit 99 is at a relatively low value (thus indicating a low compressor speed) conduction will occur through legs 103 and 106 and resistor 102. As the voltage input increases, conduction will continue through these same paths and produce an increased output at terminal 100, the increase in output being at a relatively low rate and resembling the portion of curve 97 between points 121 and 122. Continued increase in voltage at terminal 89 when point 122 on the curve 97 is reached, will result in diode 105 ceasing to conduct. At this time, the current flow beyond terminal 100 is through resistor 102 and leg 106. As the voltage at terminal 89 increases, as a result of an increase in speed of, compressor 13, the voltage output from circuit 99 at terminal 100 will also increase and will have a much greater slope, as shown between points 122 and 123 on curve 97, FIGURE 3. When point 123 is reached, diode 108 will cease to conduct, and the flow of current through circuit 99 beyond terminal 100 will be through resistor 102. As the voltage at terminal 89 continues to increase, the voltage at terminal 100 will also increase at essentially the same rate, as shown between points 123 and 124 of curve 97. When point 124 is reached, diode 111 in leg 109 will begin to conduit and the resultant current flow through circuit 99 beyond terminal 100 will be through resistor 102 and leg 109. As the voltage at terminal 89 increases even more with corresponding increase in speed of compressor 13, point 125 on curve 97 is reached at which time, diode 113 begins to conduct. In the foregoing manner a voltage output is obtained from terminal 100 of "condensing temperature-compressor speed" translator circuit 99, this voltage being representative of the optimum condensing temperature which is desired at any given compressor speed. It will, of course, be appreciated that circuit 99 can be refined by placing more legs therein.

The output from circuit 99, which is representative of the desired condensing temperature at any given compressor speed is compared with the actual condensing temperature existing in the condenser, and the actual condensing temperature is adjusted to conform with the desired temperature. In this respect, the temperature sensing element 32 including thermistor 32' (FIGURES 1 and 2) senses the actual condensing temperature in condenser 15. Thermistor 32' is placed in series with voltage divider resistors 126, 127 and 128 which extend between B+ and B−, as shown in FIGURE 2. The actual condensing temperature of condenser 15 will determine the voltage at terminal 129, that is, as the condensing temperature increases, the voltage at terminal 129, which is always negative, will decrease from one negative value to a more negative value. This voltage is transferred via lead 130 to terminal 131, the input to an operational amplifier which consists of pentode 132 and triode 133 and associated circuitry. The output voltage from "condensing temperature-compressor speed" translator circuit 99 is positive and is taken at terminal 100 and transferred via lead 134 to terminal 135, which is the same terminal as terminal 131. If the voltage from the translator circuit 99 is equal and opposite to the voltage of thermistor 32' at terminal 129, these voltages will cancel and no signal will be fed into the control grid of pentode 132. On the other hand, if a difference in voltages exists, this difference will be impressed on the control grid of pentode 132. Thus, if the output voltage from circuit 99 is of a greater positive value than the output from terminal 129 is of a negative value, the control grid of pentode 132 will become more positive. This indicates that the actual condensing temperature is lower than it should be (i.e. damper 35 should be closed more). Accordingly, this positive voltage will cause pentode 132 to conduct thus lowering its plate voltage to a less positive value. This lowered plate voltage is impressed via resistor 136 and lead 137 on the grid of triode 133, thus lessening the conduction of the latter and lowering the voltage at its cathode. On the other hand if the voltage at terminal 135 has a net negative value, the voltage at the cathode of triode 133 will rise to a positive value.

The cathode of triode 133 is coupled to B− via cathode resistor 138, and the output from the summing amplifier is taken at terminal 139 which is positioned between resistor 138 and the cathode of triode 133 in cathode follower relationship. When the summing amplifier is not operating, i.e. when it is quiescent because the desired condensing temperature is equal to the required condensing temperature, terminal 139 is at zero potential. Therefore when triode 133 changes its conduction from this quiescent state due to an unbalance in voltages at terminal 131—135, terminal 139 will be driven either positive or negative.

Coupled between terminal 139 and ground is coil 140 of a polarized relay which is energized intermittently to cause motor 33 to vary the position of damper 35 in increments. As terminal 139 is driven positive, conduction through coil 140 will be in one direcetion; and as it is driven negative, conduction will be in the opposite direction. Depending on the direction of current flow through coil 140, either contact 141 or contact 142 will be pulled into contact with terminal 143. Assuming that contact 141 is placed in contact with terminal 143, there will be a flow of current, from battery 144 (which is center-tapped to ground), through lead 145, through terminal 143 (which is in contact with contact 141), through lead 146, resistor 147, lead 148 and then through capacitor 149 to ground. It can readily be seen that resistor 147 and capacitor 149 form an R-C circuit wherein current will flow only for the length of time required to charge capacitor 149, this time depending on the relative values of resistor 147 and capacitor 149. Once capacitor 149 is charged, it will discharge through resistor 150, which is coupled between capacitor 149 and terminal 131—135, and the effect of this voltage will be to cancel the voltage at terminal 131—135 which was caused by the inequalities of voltage produced by circuit 99 and the voltage obtained from thermistor terminal 19. When capacitor 149 is partly discharged, the inequality, if it still exists, will be restored. However, it can be seen that since the inequality of voltage existing at terminal 131—135 is momentarily cancelled by the charging of capacitor 149, the potential at terminal 139 of the cathode of triode 133 will return to zero, thus de-energizing relay coil 140 and causing contact 141 to lose contact with terminal 143 until such time as the foregoing cycle is repeated. The purpose for intermittently energizing and de-energizing relay coil 140 in the foregoing manner, as noted above, is to intermittently energize motor 33 which changes the position of damper 35 (FIGURE 1) to cause the latter to assume its proper position in increments, that is, in a stepping manner. In this way the proper position of damper 35 is attained gradually with a minimum of "hunting." It is especially critical that the damper should not overshoot when it is being closed because this overshooting will raise the condensing temperature in condenser 15 to too high a value and cause "surge."

The circuitry which causes damper motor 33 to be actuated operates in response to current flowing through relay coil 140. Contacts 151 or 152 are selectively pulled into engagement with terminal 153 of the aircraft alternating voltage source 38, the other side of which is center-tapped via lead 154 between the windings 155 and 156 of motor 33. There will be contact between either of contacts 151 or 152 and terminal 153 only when current is flowing through relay coil 140 which is energized intermittently in the above described manner. The direction of rotation, and hence whether damper 35 opens or closes, will be determined by whether contact 151 or 152 is pulled into contact with terminal 153 of voltage source 38.

It can thus be seen from the foregoing description that the condensing temperature in condenser 15 is adjusted to a predetermined value which is dependent on the speed of compressor 13 in order to avoid undesirable aerodynamic drag on the aircraft and minimize compressor "surge."

Figure 2:
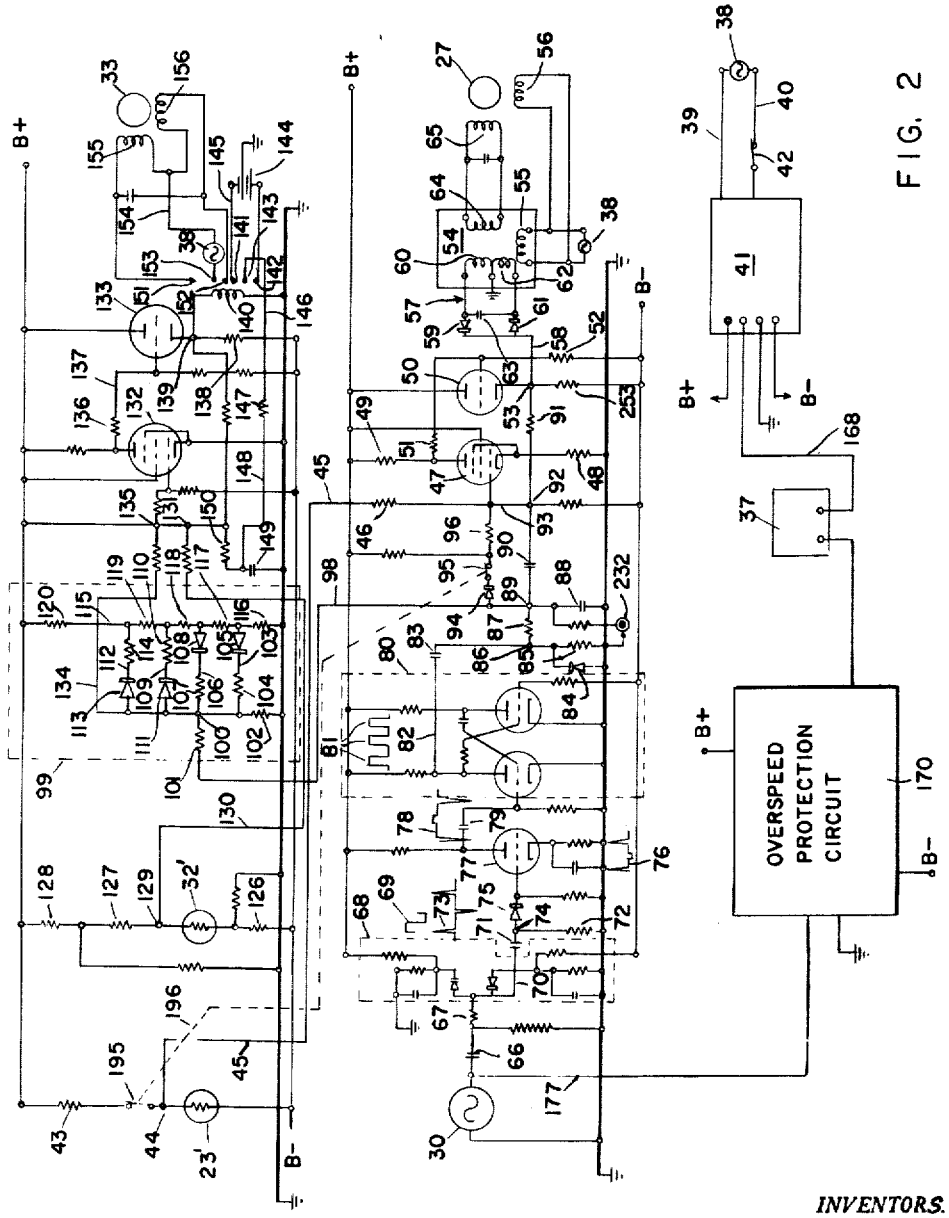
FIGURE 2 is a schematic wiring diagram of the control circuit for the air conditioning system.

The overspeed protection circuit 170 of FIGURE 2 is shown in greater detail in FIGURE 4. In this circuit, tone generator 30 produces a signal having a frequency which is proportional to the speed of compressor 13, as discussed above. This signal is fed via lead 177 through coupling condenser 196 where it is equalized by load 197 consisting of equalizing capacitor 198 placed in parallel with resistor 199, the latter being coupled between capacitor 196 and ground. Load 197 attenuates undesirable high frequency components of the signal produced by tone generator 30. Lead 200, which is coupled between capacitor 196 and load 197, conducts the signal to trap 203 and to "parallel T" notch filter 201. Trap 203, which consists of capacitor 204 and inductor 205, discards the second harmonic of the frequency signal which is representative of maximum compressor speed. The signal is then fed to "parallel T" notch filter 201 which operates in the conventional manner to pass the alternating voltage without appreciable attenuation except when the signal produced by tone generator 30 is of a frequency which indicates that the maximum permissible speed of compressor 13 has been exceeded. As shown in FIGURE 5, when this maximum speed frequency is exceeded at point 202, there will be no output from "parallel T" notch filter 201. The output from filter 201 is coupled to the grid of triode 206. It can readily be seen from FIGURE 5 that an alternating voltage will at all times be impressed on the grid of triode 206 except when the signal produced by tone generator 30 exceeds the maximum permissible value, in which event no alternating signal will be present on the plate of triode 206. Since the plate of triode 206 is coupled to the grid of triode 207, there will also be no alternating signal thereon nor will there be an alternating signal at the cathode of triode 207 when the signal produced by tone generator 30 exceeds the maximum permissible value. However, if the compressor 13 is operating within its permissible range of operation, an alternating signal will be obtained from the cathode of triode 207. This signal passes through capacitor 208 and through relay coil 209 and diode 210 to ground, the latter acting to rectify the alternating signal and provide a direct current to energize relay coil 209. When the relay coil 209 is energized, solenoid 37 (FIGURES 1, 2 and 4) will remain energized to maintain valve 36 open and thus allow turbine 12 to receive compressed gas from the turbo-jet engine 10. However, when the maximum permissible speed of compressor 13 is exceeded, there will be no alternating voltage at the cathode of triode 207 thus causing relay coil 209 to be de-energized which in turn results in the closing of solenoid 37, as explained in detail hereafter, to shut down the air conditioning system.

The operation of the overspeed protection circuit of FIGURE 4 is as follows: When power is first applied to the circuit, as by closing switch 42 (FIGURE 1) current will flow from B+ through dropping resistor to solenoid 37 to cause the valve 36 (FIGURE 1) to open to allow compressed gas to actuate turbine 12. Also due to the supplying of power to the circuit (by closing switch 42), condenser 218 will begin to charge up through resistor 219, and when it is charged to a sufficient value, sufficient current will be flowing through relay coil 220 to bring arm 221 of relay 222 into contact with terminal 223. During the charge up time of condenser 218, the compressor 13 has reached a sufficient speed so that relay coil 209 is energized. When this occurs, arm 224 will be moved out of contact with terminal 225 of relay 226. However, since this occurs prior to the time that arm 221 contacts terminal 223, the rotation of the compressor will not of itself shut down the system. If the compressor 13 exceeds its maximum speed, relay coil 209 will be deenergized in the above-described manner. Arm 224 of relay 226 will then be biased by a member such as a spring (not shown) to contact terminal 225. Current will then flow from B— via resistor 227, via arm 224 and terminal 225, via lead 228, via terminal 223 and arm 221, and via lead 229 to energize relay coil 230. Upon energization of relay coil 230, arm 215 will be pulled out of contact with terminal 216 thus breaking the flow of current to solenoid 37, whereupon valve 36 (FIGURE 1) will close in the above-described manner to stop the flow of compressed gas to turbine 12 and thus shut down the refrigerating system. The solid line positions of arms 215, 221 and 224 are those which these arms assume when the system is in operation. The dotted line positions of arms 215, 221 and 224 are those which arms assume when the operation of the system is stopped. Once the system has been stopped in the foregoing manner, it can be started again by manually resetting normally open push button switch arm 231 into contact with therminal 213 after master arm 42 (FIGURE 1) has been closed. If repeated resetting of arm 231 is not effected to start the system, it can be assumed that there is some inherent malfunction of the system which must be corrected.

It can readily be seen from the foregoing description of the circuit that the successful operation of the system depends to a great extent on the accuracy of the signal which is produced by tone generator 30. Consequently if the tone generator 30 should be grounded or have an open circuit, the control circuit will not operate properly and possible damage to the refrigerating system might result. Circuitry is therefore incorporated into the control circuit which will cause valve 36, FIGURE 1, to shut off the flow of air to turbine 12 and thus cause the refrigerating system to cease operation if tone generator 30 is not operating properly. The overspeed control circuit of FIGURE 4 inherently provides a check on the proper operation of the tone generator 30 in the following manner: If tone generator 30 has an open circuit or is shorted, there will be no signal on the grid of triode 206, and this will result in the de-energization of relay 211 in the above-described manner to close valve 36, this in turn causing the system to cease operation.

Also incorporated into the control circuit is a fail test switch linkage which is used to test whether the foregoing overspeed protection circuit is operating properly. A fail test switch 195, note FIGURE 2, is positioned between thermistor 23' and resistor 43. Switch 195 is mechanically linked by suitable linkage 196 to switch 95, as shown in FIGURE 2. When the control circuit is in normal operation, both of these switches are closed. If it is desired to test whether the overspeed protection circuit is operating properly, the linkage 196 is actuated to simultaneously open switches 195 and 95. The opening of switch 195 simulates the occurrence of a high temperature in the vicinity of the thermistor 23' since the voltage at terminal 44 is greatly lowered. This lowered voltage is transferred via lead 45 to the control grid of pentode 47, and, as described in detail above, ultimately opens valve 28 (FIGURE 1) to cause more compressed gas to be fed to the turbine 12 to cause the compressor 13 to speed up to cause evaporator 18 to absorb more heat. Since switch 95 (FIGURE 2) is open, the increased voltage at terminal 89, which is a measure of the increased speed of compressor 13, cannot be applied to the control grid of pentode 47 via diode 94 and resistor 96 to slow down the compressor, as described in detail above. Therefore, the only way in which the compressor can be stopped is through the overspeed control circuit which receives a speed signal from tone generator 30 through lead 177 and operates, in the above described manner, to actuate solenoid 37 to close valve 36. If the overspeed protection circuit is operating properly, valve 36 will close and thus shut down the compressor 13. Once it is determined that the overspeed control circuit is operating properly, switches 195 and 95 may be returned to their normally closed position and valve 36 may be opened to cause the system to resume operation.

In order to check the speed of the compressor 13, a tachometer terminal 232 (FIGURE 2) is provided. It can readily be seen that the voltage at this terminal is related to the voltage at terminal 89, the latter being proportional to the speed of compressor 13, as explained above. Thus, if it is desired to obtain a direct reading of the compressor speed, all that is necessary is to contact a properly calibrated voltmeter to terminal 232.

While we have disclosed a preferred embodiment of our invention, it will be understood that the invention is not limited thereto since it may otherwise be embodied within the scope of the following claims.

We claim:

1. A refrigeration system comprising: a variable speed compressor, a condenser, an evaporator, and an expansion member interposed between said condenser and said evaporator, said elements forming a refrigerating circuit; a temperature sensing element for measuring the condensing temperature; and control means operatively coupled to said compressor for correlating the compressor speed with the measured condensing temperature to confine the condensing temperature to a value which is dependent on the compressor speed.

2. A refrigeration system for providing cooling to a medium comprising a variable speed compressor, a prime mover for driving said compressor, a condenser, an evaporator over which said medium is continually passed, an expansion member interposed between said condenser and said evaporator, temperature sensing means for measuring the temperature of the medium after it has been cooled by said evaporator, first control means responsive to variations in the temperature of said cooled medium from a desired temperature to vary the speed of said compressor to maintain the temperature of said cooled medium substantially constant, and second control means responsive to variations in compressor speed during normal operation of the compressor to cause condensing of the refrigerant within the condenser to occur at a temperature which varies with the compressor speed.

3. An air conditioning system for use in an aircraft comprising a variable speed compressor, an air-cooled condenser, an evaporator, an expansion member interposed between said condenser and said evaporator, temperature sensing means for sensing the temperature of air which is cooled by said evaporator, first control means coupled to said temperature sensing means for maintaining the temperature of air cooled by said evaporator at a substantially constant value by varying the speed of said compressor, an air duct housing said condenser through which air scooped from outside of the aircraft is passed, and second control means for changing the condensing temperature in response to changes in compressor speed by varying the amount of air passing through said air duct whereby undesirable aerodynamic drag on the aircraft is avoided and the occurrence of compressor surge is minimized.

4. In combination with an aircraft: a refrigeration system including a variable speed centrifugal compressor, an air-cooled condenser, an evaporator, an expansion member coupled between said condenser and said evaporator, and control means coupled between said compressor and said condenser for varying the condensing temperature with variations in compressor speed by varying the amount of cooling air provided to said condenser whereby both undesirable aerodynamic drag on the aircraft and undesirable compressor surge are minimized.

5. A refrigeration system as set forth in claim 4 including second control means coupled between said evaporator and said compressor for varying the speed of the latter in response to variations in cooling requirements of the system.

6. A refrigeration system as set forth in claim 4 including means for stopping said compressor if it exceeds a maximum permissible speed.

7. A method of air conditioning an aircraft with a refrigeration system including a variable speed centrifugal compressor, an air-cooled condenser, and an evaporator comprising the steps of: providing cooling to a medium by passing it over the evaporator, varying the amount of cooling produced by the evaporator, by varying the speed of the compressor, cooling the condenser by passing air scooped from outside of the aircraft in contact with it, and controlling the temperature of the condenser in response to variations in compressor speed by varying the amount of air passed over it whereby both undesirable aerodynamic drag on the aircraft and the occurrence of compressor surge are minimized.

8. An aircraft air conditioning system comprising a variable speed compressor, an air-cooled condenser, an evaporator, an expansion member interposed between said condenser and said evaporator, temperature sensing means for sensing the temperature of air which is cooled by said evaporator, first control means coupled to said temperature sensing means for maintaining the temperature of air cooled by said evaporator at a substantially constant value by varying the speed of said compressor, means for cooling said condenser comprising an air duct through which air scooped from outside of the aircraft is caused to pass over said condenser, a damper in said air duct, second control means for changing the condenser temperature in response to changes in compressor speed by varying the amount of air passing through said air duct by adjusting the position of said damper, said second control means comprising first circuit means coupled to said compressor for producing a first electrical signal which is proportional to the speed of said compressor, second circuit means for producing a second electrical signal having a magnitude which is dependent on the magnitude of said first signal, means for producing a third electrical signal which is proportional to the actual temperature of said condenser, third circuit means for comparing said second and third signals and providing an output which is proportional to their difference, and motor means coupled to said third circuit means for adjusting the position of said damper in said air duct to vary the amount of air passing therethrough to thereby maintain the temperature of said condenser at a value which is dependent on the speed of said compressor whereby both undesirable aerodynamic drag on the aircraft and compressor surge are minimized.

9. An aircraft air conditioning system comprising a variable speed compressor, an air cooled condenser, an evaporator, an expansion member interposed between said condenser and said evaporator, first temperature sensing means positioned proximate said evaporator for sensing the temperature of the medium which is cooled by said evaporator, first control means coupled to said first temperature sensing means for varying the speed of said compressor in response to variations in temperature of said medium in order to maintain said temperature at a substantially constant value, means for cooling said condenser comprising an air duct through which air scooped from outside of said aircraft is passed, a damper positioned in said air duct, and second control means coupled to said compressor for changing the position of said damper in said air duct to vary the amount of air passed through said duct in response to changes in speed of said compressor to thus vary the condensing temperature, said second control means comprising speed sensing means coupled to said compressor for producing a signal which is a measure of said compressor speed, a condenser temperature-compressor speed translator circuit coupled to said speed sensing means for producing an output for any given compressor speed which is indicative of the desired condenser temperature at that speed at which undesirable aerodynamic drag on the aircraft and undesirable compressor surge are both at a minimum, second temperature sensing means positioned proximate said condenser for producing an output which is a measure of the actual condenser temperature, circuit means coupled to said condenser temperature-compressor speed translator circuit and said second temperature sensing means for comparing the relative values of their outputs and producing an output which is dependent on this comparison, and motor means coupled to said circuit means and to said damper for varying the position of said damper in response to the output produced by said circuit means whereby the condenser temperature is adjusted to minimize both undesirable aerodynamic drag on the aircraft and compressor surge.

10. An air conditioning system as set forth in claim 9 wherein said circuit means includes means for causing said motor means to operate intermittently to adjust the position of said damper by increments.

11. An air conditioning system as set forth in claim 9 including a turbine coupled to said variable speed compressor for driving the latter, a supply source of driving fluid for said turbine, a conduit coupling said supply source and said turbine, a valve positioned in said conduit, said first control means including motor means responsive to the output from said first temperature sensing means for changing the position of said valve as said temperature of said medium varies from a desired temperature to vary the supply of fluid to said turbine to thus vary the speed of said compressor to maintain the desired temperature.

12. An air conditioning system as set forth in claim 11 including anti-hunting means coupled between said temperature sensing means and said motor means to cause the position of said valve to be adjusted with a minimum of vacillation.

13. An aircraft air conditioning system as set forth in claim 9 including means coupled to said speed sensing means for stopping operation of said air conditioning system if the compressor speed should exceed a predetermined maximum value.

14. An aircraft air conditioning system as set forth in claim 13 wherein said speed sensing means is a tone generator for producing a signal having a frequency which is proportional to the speed of said compressor, a parallel-T notch filter coupled to said tone generator for passing all frequencies except the frequency which is representative of said predetermined maximum speed, amplifying means coupled to said notch filter for amplifying the signal passed by said notch filter, rectifying means coupled to said amplifying means for converting said frequency signal to a direct current signal, and relay means coupled to said rectifying means and operatively associated with said compressor for stopping the latter when said notch filter passes no signal at said maximum predetermined value.

15. In a refrigeration system, a variable speed compressor, a condenser, an evaporator, an expansion member positioned between said condenser and said evaporator, temperature sensing means positioned proximate said evaporator for producing an output when the temperature of the medium being cooled by said evaporator departs from a predetermined value, means coupled to said temperature sensing means for changing the speed of said compressor in response to said output to cause the temperature of said medium to approach said predetermined temperature, speed sensing means coupled to said compressor for producing an output which is proportional at all times to the speed of said compressor, means coupled to said speed sensing means for producing an output which is proportional to the rate of change of speed of said compressor, said last-mentioned output being fed into said compressor speed changing means in opposition to the output produced by said temperature sensing means whereby hunting of said compressor during speed changes is minimized.

16. In a refrigeration system, a variable speed compressor, a condenser, an evaporator, and an expansion member coupled between said condenser and said evaporator, a thermistor circuit positioned proximate said evaporator for producing a voltage when the temperature of the medium being cooled by said evaporator varies from a predetermined temperature, amplifying means coupled to said thermistor circuit, means coupled to said amplifying means for varying the speed of said compressor in response to said temperature change in order to cause said temperature to approach said predetermined temperature, a speed sensing circuit coupled to said compressor for producing a voltage which is proportional to the speed of said compressor, a differentiator coupled to said speed sensing circuit to produce a voltage which reflects the rate of change of speed of said compressor, said differentiator being coupled to said amplifying means whereby said voltage produced by said differentiator opposes said voltage produced by said thermistor circuit to cause said compressor to approach its required speed with a minimum of vacillation.

17. A refrigeration system for providing cooling to a medium comprising a variable speed compressor, a prime mover for driving said compressor, an air cooled condenser, an evaporator over which said medium is continually passed, an expansion member interposed between said condenser and said evaporator, temperature sensing means for measuring the temperature of the medium after it has been cooled by said evaporator, first control means responsive to variations in the temperature of said cooled medium from a desired temperature to vary the speed of said compressor to maintain the temperature of said cooled medium substantially constant, a speed sensing device for measuring the speed of said compressor, anti-hunting means coupled to said speed sensing device for causing said compressor speed to be varied in the desired direction with a minimum of vacillation, second control means coupled to said speed sensing device to vary the amount of cooling air supplied to said condenser as said compressor speed changes to vary the condensing temperature, and third control means responsive to the speed sensing device for stopping said compressor if its speed should exceed a predetermined maximum and for stopping said compressor if said speed sensing device is rendered inoperative.

18. A refrigeration system for providing cooling to a medium comprising a variable speed compressor, a prime mover for driving said compressor, a condenser, an evaporator over which said medium is continually passed, an expansion member interposed between said condenser and said evaporator, temperature sensing means for measuring the temperature of the medium after it has been cooled by said evaporator, first control means responsive to variations in the temperature of said cooled medium from a desired temperature to vary the speed of said compressor to maintain the temperature of said cooled medium substantially constant, and second control means responsive to variations in compressor speed to cause condensing of the refrigerant within the condenser to occur at a temperature which varies with the compressor speed, said condenser being air-cooled, said second control means including means for adjusting said condenser temperature by varying the amount of air passed over said condenser.

19. A refrigeration system for providing cooling to a medium comprising a variable speed compressor, a prime mover for driving said compressor, a condenser, an evaporator over which said medium is continually passed, an expansion member interposed between said condenser and said evaporator, temperature sensing means for measuring the temperature of the medium after it has been cooled by said evaporator, first control means responsive to variations in the temperature of said cooled medium from a desired temperature to vary the speed of said compressor to maintain the temperature of said cooled medium substantially constant, and second control means responsive to variations in compressor speed to cause condensing of the refrigerant within the condenser to occur at a temperature which varies with the compressor speed, said first control means including anti-hunting means for causing said compressor speed to be varied in the desired direction with a minimum of vacillation.

20. A refrigeration system for providing cooling to a medium comprising a variable speed compressor, a prime mover for driving said compressor, a condenser, an evoporator over which said medium is continually passed, an expansion member interposed between said condenser and said evaporator, temperature sensing means for measuring the temperature of the medium after it has been cooled by said evaporator, first control means responsive to variations in the temperature of said cooled medium from a desired temperature to vary the speed of said compressor to maintain the temperature of said cooled medium substantially constant, and second control means responsive to variations in compressor speed to cause condensing of the refrigerant within the condenser to occur at a temperature which varies with the compressor speed, a speed sensing device for measuring the speed of said compressor, and third control means responsive to the speed sensing device for stopping said compressor if its speed should exceed a predetermined maximum.

21. A refrigeration system comprising a variable speed compressor, a condenser, an evaporator, an expansion member interposed between said condenser and said evaporator, means providing a variable flow of cooling medium over said condenser, and control means for regulating the speed of the compressor in response to temperature of said evaporator, said control means being selectively operable to solely regulate flow of cooling medium over said condenser and being effective only in the event the change in compressor speed involves departure from a predetermined condensing pressure-compressor speed relationship.

References Cited in the file of this patent

UNITED STATES PATENTS

| | | |
|---|---|---|
| 2,112,038 | McLenegan | Mar. 22, 1938 |
| 2,112,039 | McLenegan | Mar. 22, 1938 |
| 2,398,655 | Mayer | Apr. 16, 1946 |
| 2,458,560 | Buchanan | Jan. 11, 1949 |
| 2,590,393 | Few et al. | Mar. 25, 1952 |
| 2,626,507 | Dickieson | Jan. 27, 1953 |
| 2,718,119 | Prince | Sept. 20, 1955 |
| 2,747,146 | McDonald | May 22, 1956 |
| 2,748,572 | Parcaro | June 5, 1956 |
| 2,779,163 | Jacobs | Jan. 29, 1957 |
| 2,856,758 | Eggleston et al. | Oct. 21, 1958 |
| 2,867,992 | McGuffey | Jan. 13, 1959 |
| 2,880,595 | McGuffey et al. | Apr. 7, 1959 |

UNITED STATES PATENT OFFICE
CERTIFICATE OF CORRECTION

Patent No. 3,082,609                      March 26, 1963

Matthew G. Ryan et al.

It is hereby certified that error appears in the above numbered patent requiring correction and that the said Letters Patent should read as corrected below.

Column 6, line 21, for "clamp" read -- clamped --; line 53, for "diferentiator" read -- differentiator --; column 7, line 9, after "As" insert -- the --; column 8, line 26, after "and", first occurrence, insert -- leg --; line 68, for "conduit" read -- conduct --; column 9, line 65, for "direcetion" read -- direction --; column 10, line 11, for "19" read -- 129 --; column 11, line 64, for "therminal" read -- terminal --; column 12, line 55, for "contact" read -- connect --.

Signed and sealed this 19th day of November 1963.

(SEAL)
Attest:

EDWIN L. REYNOLDS

ERNEST W. SWIDER
Attesting Officer                      Acting Commissioner of Patents